United States Patent

Asakawa et al.

[11] Patent Number: 6,065,461
[45] Date of Patent: May 23, 2000

[54] INGOT SLICING METHOD AND APPARATUS THEREFOR

[75] Inventors: Keiichiro Asakawa; Hiroshi Oishi, both of Annaka, Japan

[73] Assignee: Super Silicon Crystal Research Institute Corp., Japan

[21] Appl. No.: 09/039,958

[22] Filed: Mar. 16, 1998

[30] Foreign Application Priority Data

Mar. 17, 1997 [JP] Japan ................................. 6-063051

[51] Int. Cl.⁷ ............................. B28D 1/06; B28D 1/08
[52] U.S. Cl. .................................... 125/16.02; 125/21
[58] Field of Search ........................ 125/16.01, 16.02, 125/21

[56] References Cited

U.S. PATENT DOCUMENTS

| | | | |
|---|---|---|---|
| 5,735,258 | 4/1998 | Okuno et al. | 125/16.02 |
| 5,778,869 | 7/1998 | Toyama | 125/16.02 |
| 5,842,462 | 12/1998 | Schmid et al. | 125/16.02 |
| 5,857,454 | 1/1999 | Shibaoka | 125/16.02 |
| 5,875,770 | 3/1999 | Fukunaga | 125/16.02 |

*Primary Examiner*—Timothy V. Eley
*Attorney, Agent, or Firm*—Webb Ziesenheim Logsdon Orkin & Hanson, P.C.

[57] ABSTRACT

An ingot slicing method and apparatus is disclosed. An ingot is sliced by a wire saw having a wire wound over a plurality of grooved rollers at a predetermined pitch. The ingot is secured to a holder and then pressed onto the wire which is carried along one direction or reciprocatively carried over a plurality of grooved rollers. The holder is shifted along one direction parallel to an axis of the grooved rollers until about a half section of the ingot is sliced. The holder is shifted along an inverse direction during slicing the remainder of the ingot. Thus, a wafer sliced off the ingot has a bowed shape corresponding to a locus of movement of the holder.

3 Claims, 2 Drawing Sheets movement of a holder a bow of a wafer

6,065,461

INGOT SLICING METHOD AND APPARATUS THEREFOR

BACKGROUND OF THE INVENTION

The present invention relates to a method of slicing a silicon ingot with a wire saw which can freely adjust a bow to be allotted to a wafer and is also concerned with an apparatus therefor.

A wafer useful as a substrate for semiconductor devices is sliced off an ingot. Such an ingot is prepared by a CZ crystal growing method or the like. After top and tail parts are cut off the ingot, the ingot is processed by a crystal surface grinding machine and then sliced to a plurality of wafers having predetermined thickness. A commonly used slicer is an inner diameter saw, but a wire saw using a high tension steel wire or the like has been recently used to cope with enlargement of wafers in size.

A conventional wire saw has a wire wound over a plurality of grooved rollers with a predetermined pitch. The wire is uncoiled from a reel, carried over the grooved rollers along one direction, and coiled onto another reel. The wire may be reciprocatively carried between two reels. An ingot is pressed onto the wire, while an abrasive slurry is supplied to the wire. Due to the cutting force of the wire, the ingot is sliced to a plurality of wafers having a thickness approximately equal to the pitch with which the wire is wound over the grooved rollers.

After a sliced wafer is lapped, chemically etched and then polished, it is processed in device-making steps such as CVD or epitaxy. The wafer is likely bowed during the processing. A bow shall be controlled within a predetermined range; otherwise it would be difficult to build up a semiconductor having predetermined structure with high accuracy.

In order to properly control a final bow allotted to a wafer, it is preferable to slice an ingot to wafers having a shape which compensates for deformation during the device-making steps. A properly controlled bow effectively cancels deformation of wafers during CVD, epitaxy, etc. and enables construction of semiconductor devices with accurate design.

For instance, Japanese Patent Application Laid-Open 8-323741 discloses use of the displacement of grooved rollers for slicing an ingot to properly bowed wafers. A bearing part for grooved rollers is thermally expanded by use of friction heat during rotation of grooved rollers or by temperature control so as to displace the grooved rollers along an axial direction.

However, the proposed method requires precise temperature control, since the axial displacement of the grooved rollers depends on the thermal expansion of the bearing part. In addition, since a pair of grooved rollers are necessarily shifted in the same displacement distance along the axial direction, the grooved rollers shall be located and preset with high dimensional accuracy. Such accurate setting needs a fairly long time. Consequently, the apparatus lacks in operatability, and properly bowed wafers are obtained at a poor yield ratio.

SUMMARY OF THE INVENTION

The present invention aims at production of properly bowed wafers at a high yield ratio without the necessity of troublesome temperature control or positional adjustment.

An ingot slicing method according to the present invention is characterized by shifting a holder which secures an ingot thereon along one direction parallel to an axis of grooved rollers until a half section of the ingot is sliced and then along an inverse direction during slicing the remaining half of the ingot, when the ingot is pressed onto a wire which is wound over a plurality of the grooved rollers at a predetermined pitch and to which a slurry is supplied.

A movement distance of the holder is adjusted to a value corresponding to a bow which is expected to be allotted to wafers. The movement distance of the holder may be rectified in response to a degree of thermal expansion-induced displacement of the grooved rollers along the axial direction, so as to accurately control a degree of the bow.

A wire sawing apparatus designed for the purpose comprises a pair of grooved rollers located in parallel together at both sides of an ingot, a holder for securing the ingot, a lifter for carrying the holder together with the ingot along a vertical direction, a feed screw inserted into the holder, a driving motor for applying a torque to the feed screw, a guide member for guiding said holder which is carried by rotation of the feed screw, and control means for calculating movement of the holder in response to a sliced degree of the ingot and outputting a control signal to the driving motor so as to adjust a rotation speed of the feed screw and to switch a rotating direction of the feed screw in response to a sliced degree of the ingot. The grooved rollers have a plurality of grooves engraved on their surfaces for passage of the wire.

The influence of the displacement of the grooved rollers can be canceled by controlled movement of the holder. For this purpose, a position sensor is provided for detecting displacement of the grooved rollers caused by thermal expansion, and a degree of displacement detected by the position sensor is inputted to the control means which calculates a movement locus of the holder so as to compensate for displacement of the grooved rollers.

PREFERRED EMBODIMENT OF THE INVENTION

The present invention is realized by reciprocatively shifting a holder for securing an ingot thereon along controlled directions during slicing an ingot in response to a sliced degree of the ingot without basically changing or complexing the structure of a wire saw.

Figure 1:
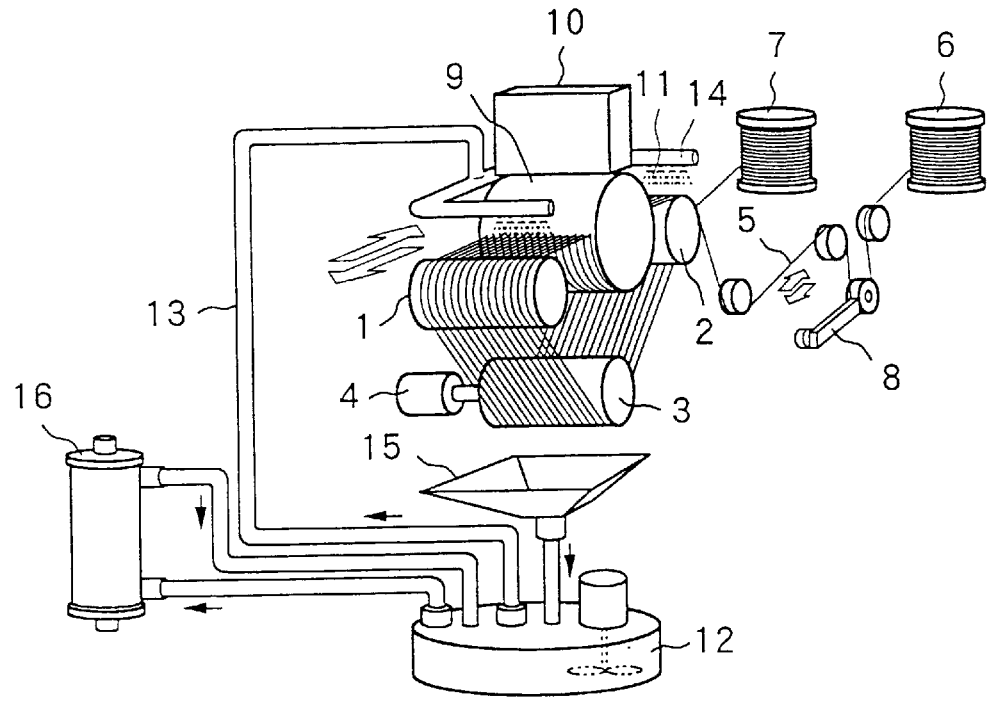
FIG. 1 is a schematic view illustrating a wire sawing apparatus.

The wire saw has three grooved rollers 1–3 in general, as shown in FIG. 1. One of the grooved rollers is coupled to a driving motor 4. A wire 5 wound over these grooved rollers 1–3 is uncoiled from a wire reel 6 and coiled onto another wire reel 7. A tension is preferably applied to the wire 5 by a tensioner 8, so that the wire in stretched state is carried along one direction or reciprocatively carried over the groove rollers 1–3.

An ingot 9 to be sliced is secured to a holder 10 and located between the grooved rollers 1 and 2. During slicing the ingot 9, a slurry 11 is supplied to the wire 5 to facilitate the slicing action. After the slurry 11 is supplied from a slurry reservoir 12 through a feed pipe 13 and a nozzle 14 to the wire 5, the slurry 11 is recovered in a pan 15 and then returned to the slurry reservoir 12. The slurry is cooled by circulation between the slurry reservoir 12 and a heat exchanger 16.

Figure 2:
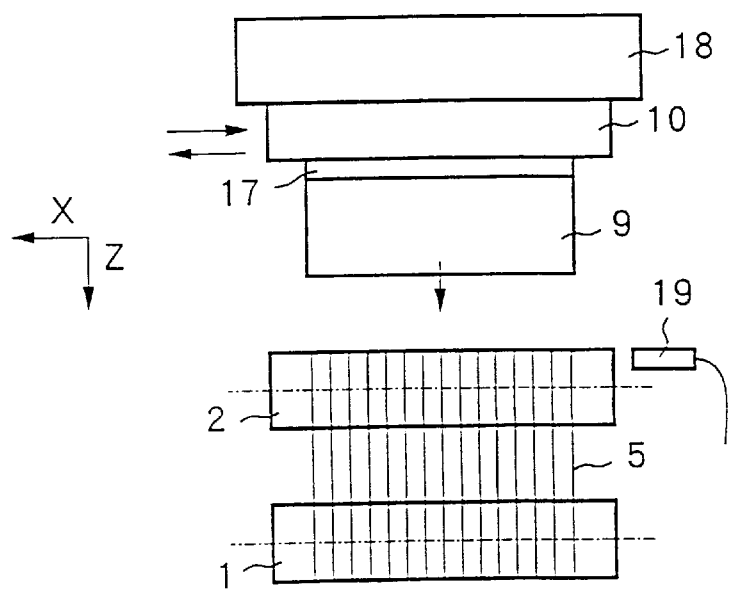
FIG. 2 is a schematic view illustrating a mechanism for reciprocatively shifting a holder.

The ingot 9 is secured through a graphite plate 17 to a holder 10, as shown in FIG. 2. The holder 10 can be reciprocatively shifted along a direction X shown by the arrow and also lifted along a vertical direction Z by a lifter 18. A position sensor 19 is provided at a position facing to side surfaces of the grooved rollers 1, 2.

Figure 3:
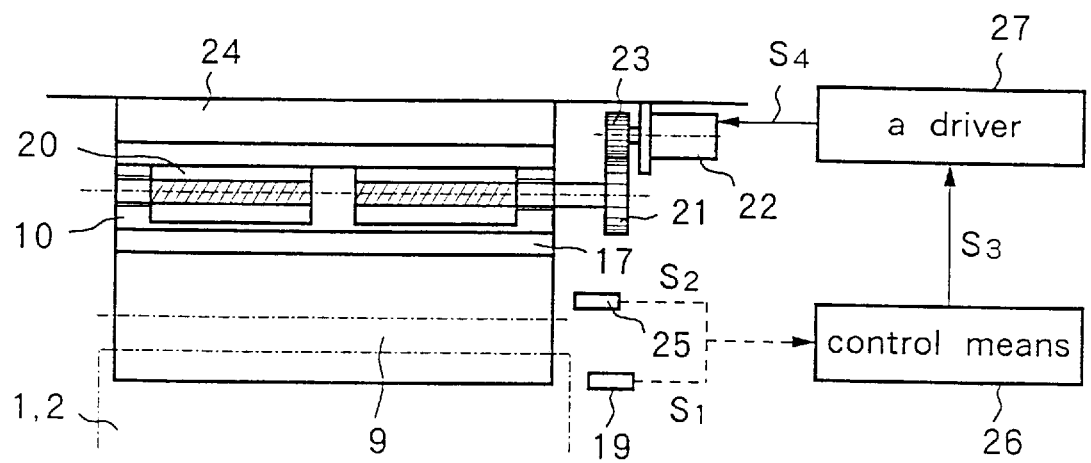
FIG. 3 is a schematic view illustrating a control system for controlling the movement of a holder.

Reciprocation of the holder 10 along the direction X is controlled by control means shown in FIG. 3. The control means has a feed screw 20 inserted into the holder 10. The feed screw 20 is secured to a driven gear 21 at its end. When the driven gear 21 is rotated by a driving force transmitted from a driving motor 22 through a driving gear 23, the holder 10 is shifted along a guide 24 by rotation of the feed screw 20.

When a servo motor may be used as the driving motor 22 for instance, a position signal $S_1$ of the grooved rollers 1, 2 detected by the position sensor 19 and a position signal $S_2$ of the ingot 9 detected by another position sensor 25 are inputted to the control means 26. The control means 26 calculates a movement degree of the holder 10 which compensate for displacement of the grooved rollers 1, 2 caused by thermal expansion and outputs a signal $S_3$ to a driver 27 according to a closed-loop control system. The driver 27 outputs a control signal $S_4$ to the servo motor (the driving motor 22), so as to shift the holder 10 in a certain distance according to a predetermined program.

Movement of the holder 10 may be controlled by an open-loop control system using a stepping motor, instead. In this way, a rotation speed and a rotating direction of the driving motor 22 are adjusted in response to a sliced degree of the ingot 9, and the ingot 9 is sliced to wafers having a properly bowed shape.

Figure 4:
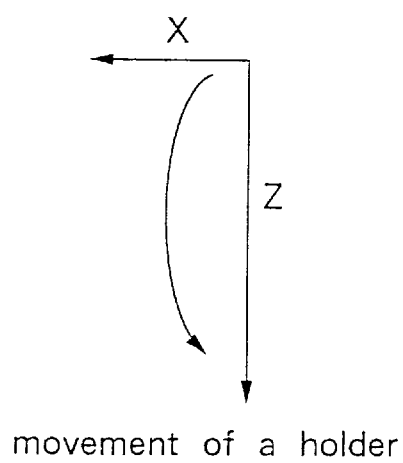
FIG. 4 is a view showing a locus of movement of a holder.
Figure 5:
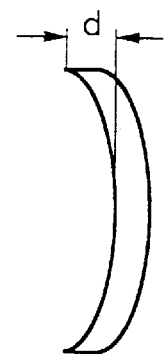
FIG. 5 is a sectional view of a wafer which has a bowed shape corresponding to a locus of movement of a holder.

During slicing, the holder 10 is shifted along one direction until nearly a half section of the ingot 9 is sliced by the wire 5. Thereafter, the holder 10 is shifted along an inverse direction during slicing the remaining half of the ingot 9. That is, the holder 10 is shifted along a locus of movement as shown in FIG. 4. Consequently, a wafer sliced off the ingot 9 has a bowed shape, as shown in FIG. 5, inversely to the locus of movement of the holder 10. A proper bow can be allotted to the wafer by controlled reciprocation of the ingot 9 coupled with the holder 10 without complex constitution of the wire saw. In addition, a degree of the bow can be easily controlled by changing the locus of movement of the holder 10.

During slicing the ingot 9, the grooved rollers 1, 2 are heated by friction with the wire 5. The friction heat causes thermal expansion of the grooved rollers 1, 2 along its axial direction. Displacement of the grooved rollers 1, 2 caused by the thermal expansion would put harmful influences on a shape of the wafer. Such harmful influences are eliminated by detecting displacement of the grooved rollers 1, 2 and rectifying the locus of movement of the holder 10 in response to the detected value of displacement.

For instance, actual displacement detected by the position sensor 19 is compared with a preset value of displacement, a control signal corresponding to a difference between the detected value and the preset value is outputted to the driving motor 22, and the holder 10 is shifted in a controlled distance which cancels displacement of the grooved rollers 1, 2 caused by thermal expansion.

A properly controlled bow allotted to the wafer in this way reduces a final bow which will occur during device-making steps such as CVD and epitaxy, so that a certain pattern can be transcribed to the wafer with high accuracy in a photo-lithography step and that the wafer can be held in stable state with a vacuum chuck. Consequently, high-grade devices can be produced at a high yield ratio.

EXAMPLE

Grooved rollers 1, 2 having grooves formed at a pitch of 1.100 mm on their surfaces were located at both sides of an ingot 9. A high tension steel wire 5 of 0.18 mm in diameter was wound over the grooved rollers 1, 2. The wire 5 was carried at an averaged linear speed of 500 m/min according to such a reciprocative running mode to supply a new wire at a speed of 100 m/min. An ingot 9 of 200 mm in diameter was sliced by the wire saw, while a slurry 11 prepared by mixing abrasives GC#600 in a lapping oil was supplied to the wire 5 at a flow rate of 70 liters/min.

It took 200 min. to slice the ingot 9 to a depth of 100 mm corresponding to a half of its diameter from the beginning of slicing. During this slicing step, the holder 10 was shifted leftwards in FIG. 2 at an averaged speed of 0.25 $\mu$m/min.

It further took 200 min. to slice the remaining half of the ingot 9. During this slicing step, the holder 10 was shifted rightwards in FIG. 2 at an averaged speed of 0.25 $\mu$m/min.

When a wafer obtained in this way was observed, a bow was allotted to the wafer at a value d (shown in FIG. 5) of 50 $\mu$m. The locus of movement of the holder 10 was accurately reflected on the bow. When other ingots were sliced while changing the locus of movement of the holder 10, a value d of the bow was varied in the range of 10–100 $\mu$m in response to the locus of movement.

According to the present invention as aforementioned, an ingot is reciprocatively shifted during slicing the ingot with a wire saw. A proper bow is easily allotted to wafers sliced off the ingot by controlling reciprocative movement of the ingot during slicing without basically changing or complexing the constitution of a wire saw. When a wafer having a shape bowed in this way is subjected to CVD, epitaxy or the like, a final bow is reduced, and high-grade semiconductor devices are produced at a high yield ratio.

What is claimed is:

1. A method of slicing an ingot by a wire saw having a wire wound over a plurality of grooved rollers at a predetermined pitch, comprising the steps of:

securing an ingot to a holder;

pressing said ingot onto a wire which is movably carried over a plurality of grooved rollers having axes of rotation;

shifting said holder along a first direction parallel to the axes of rotation of said grooved rollers until about a half section of said ingot is sliced; and shifting said holder along a second direction opposite to the first direction to slice the remainder of said ingot, whereby a wafer sliced off said ingot has a bowed shape corresponding to a locus of movement of the holder.

2. The method according to claim 1, including detecting axial displacement of the grooved rollers caused by thermal expansion and adjusting the movement of the holder to cancel such thermal axial displacement.

3. A wire sawing apparatus for slicing an ingot, comprising:

a plurality of grooved rollers arranged substantially in parallel with each other and having grooves for passage of a wire, a holder configured to secure an ingot, a lifter for carrying said holder together with the ingot along a substantially vertical direction, a feed screw inserted into said holder, a driving motor for applying a torque to said feed screw, a guide member for guiding said holder which is carried by rotation of said feed screw;

a position sensor for detecting displacement of said grooved rollers, and control means for calculating movement of said holder during slicing of the ingot and for outputting a control signal to said driving motor to adjust the rotation speed of said feed screw and to switch the rotational direction of said feed screw.

* * * * *

UNITED STATES PATENT AND TRADEMARK OFFICE
CERTIFICATE OF CORRECTION

PATENT NO. : 6,065,461
DATED : May 23, 2000
INVENTOR(S) : Keiichiro Asakawa et al.

It is certified that error appears in the above-identified patent and that said Letters Patent is hereby corrected as shown below:

Title Page [30] Foreign Application Priority Data "6-063051" should read --9-06305--.

Signed and Sealed this

Third Day of April, 2001

Attest:

NICHOLAS P. GODICI

*Attesting Officer*    *Acting Director of the United States Patent and Trademark Office*